Dec. 11, 1962  R. E. RAYMOND  3,067,772
SURGE SUPPRESSOR VALVE
Filed April 15, 1959  3 Sheets-Sheet 1
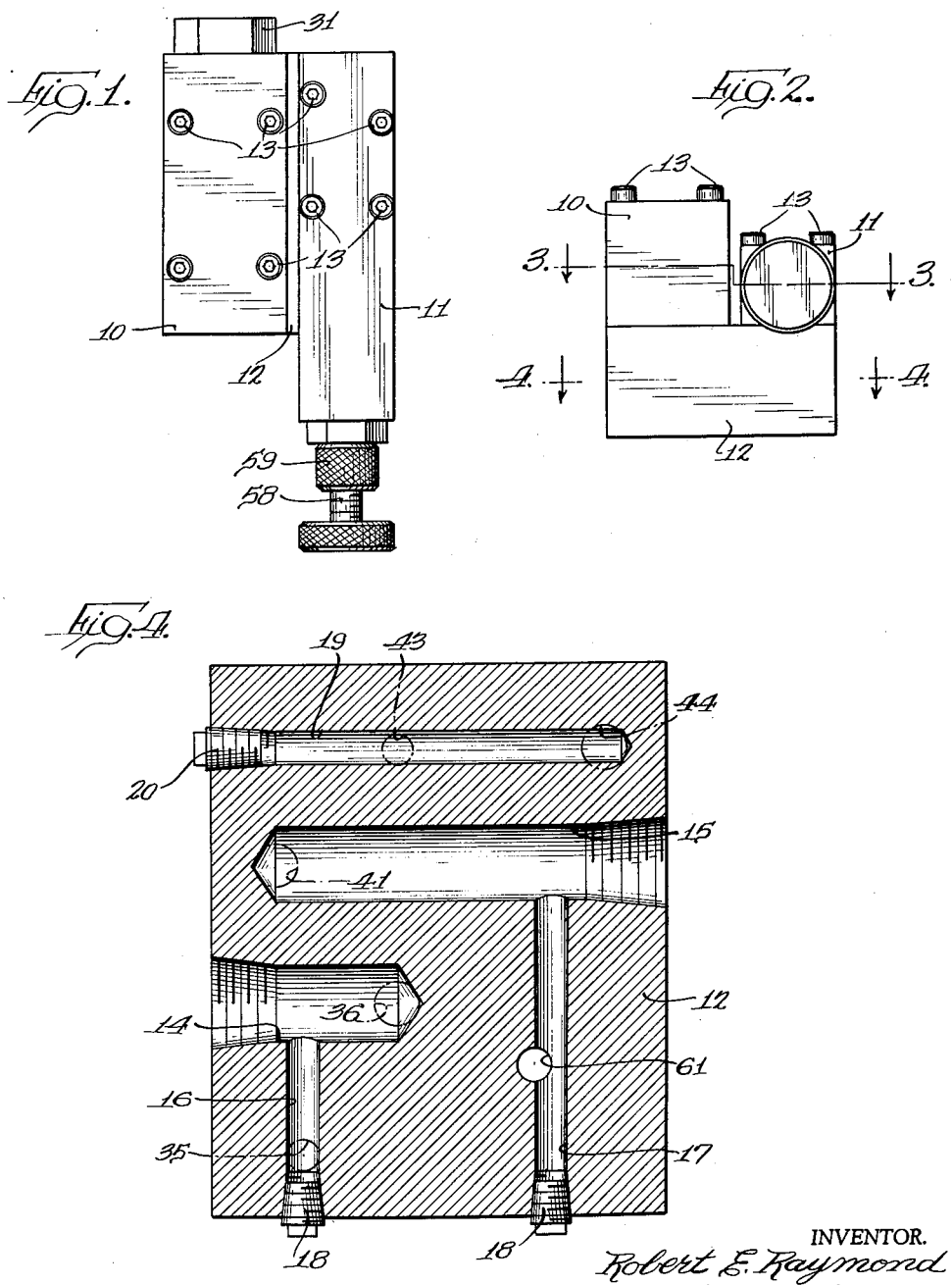
INVENTOR.
Robert E. Raymond
BY Hofgren, Brady,
Wegner, Allen & Stellman
Attys

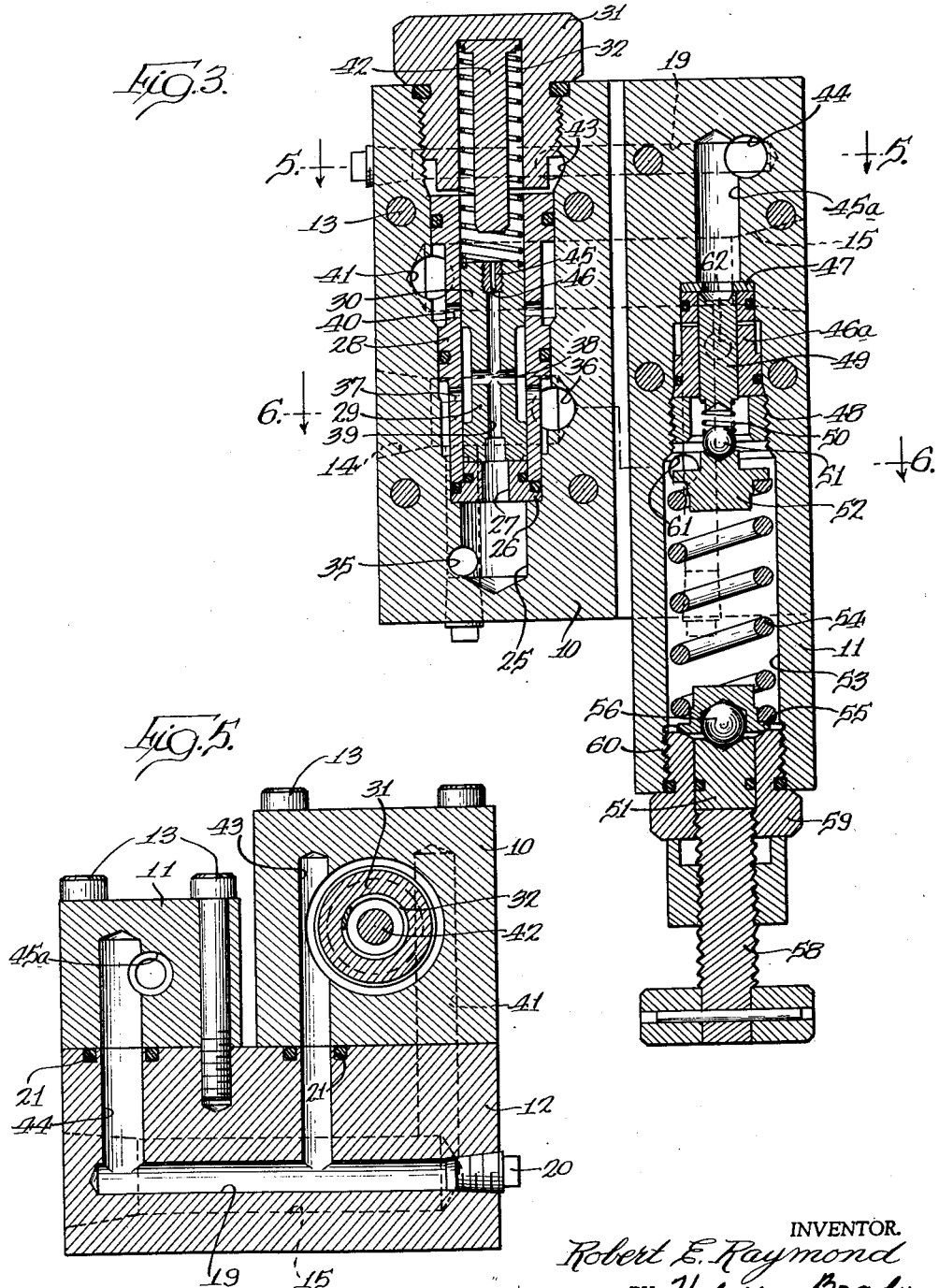

Dec. 11, 1962 R. E. RAYMOND 3,067,772
SURGE SUPPRESSOR VALVE
Filed April 15, 1959 3 Sheets-Sheet 3
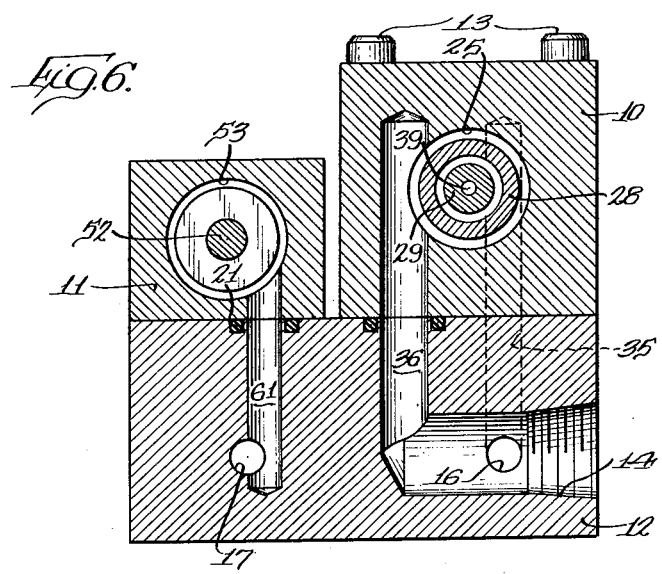
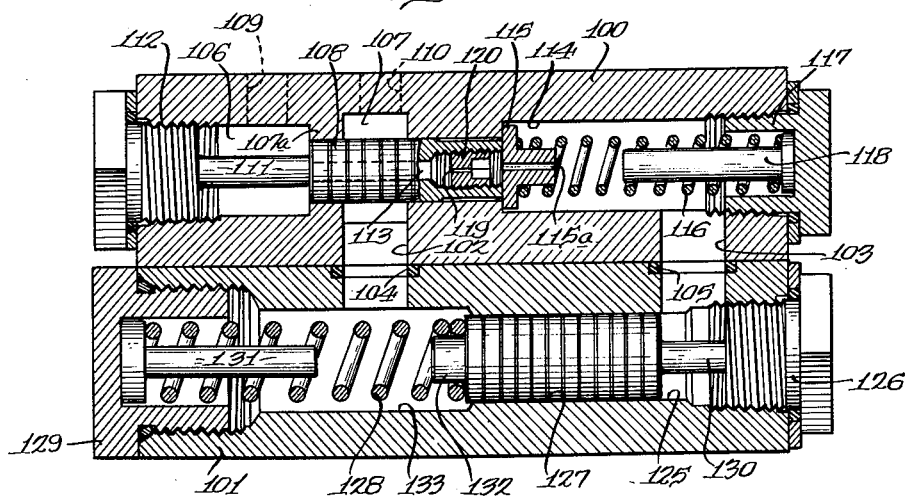
INVENTOR.
Robert E. Raymond United States Patent Office 3,067,772
Patented Dec. 11, 1962

3,067,772
SURGE SUPPRESSOR VALVE
Robert E. Raymond, Zanesville, Ohio, assignor to Racine Hydraulics and Machinery, Inc., a corporation of Wisconsin
Filed Apr. 15, 1959, Ser. No. 806,510
1 Claim. (Cl. 137—494)

This invention relates to mechanism for suppressing pressure surges in a hydraulic system, and more particularly to a hydraulic surge suppressor valve.

Objects of the invention are to provide a surge suppressor valve construction embodying a unique selection and combination of structural components assembled in a manner whereby a valve is provided in which the rate of pressure rise in the hydraulic fluid is sensed and corrective measures are taken to eliminate or minimize the surge in pressure before the total hydraulic pressure exceeds a desired value with resultant shock in the system.

Further objects and advantages will become apparent from the following detailed description taken in connection with the accompanying drawings in which:

FIG. 1 is a plan view of the surge suppressor valve;

FIG. 2 is a front elevational view of the surge suppressor valve;

FIG. 3 is a plan section on an enlarged scale taken generally along the line 3—3 in FIG. 2;

FIG. 4 is a plan section on an enlarged scale taken through the sub base and generally along the line 4—4 in FIG. 2 with certain communicating vertical passageways shown in dot-dash line;

FIG. 5 is a vertical section taken generally along the line 5—5 in FIG. 3;

FIG. 6 is a vertical section taken generally along the line 6—6 in FIG. 3; and

FIG. 7 is a vertical section taken through another embodiment of the surge suppressor valve.

While this invention is susceptible of embodiments in many different forms, there is shown in the drawings and will herein be described in detail an embodiment of the invention together with a modification thereof with the understanding that the present disclosure is to be considered as an exemplification of the principles of the invention and is not intended to limit the invention to the embodiment illustrated. The scope of the invention will be pointed out in the appended claims.

Hydraulic shock, which can be described as the rapid build-up of pressure caused by inertia effects, associated with rapid deceleration or acceleration of a fast moving column of fluid, or other loads connected to the hydraulic system, has long been one of the most serious problems in the design of hydraulic components and hydraulic machinery. A pressure rise, therefore, occurs when transfer from the kinetic energy state to the potential energy state takes place with changes in the velocity of the fluid. A fast operating valve shutting off the flow of hydraulic fluid will cause excessive shock in a close, tight hydraulic system. In order to reduce the shock problem, the valve mechanism disclosed herein anticipates the fact that an over-pressure surge will occur by the use of pressure-time derivative response, and takes corrective measures to eliminate or minimize the surge.

In the embodiment of surge suppressor valve mechanism disclosed in FIGS. 1 to 6, the mechanism embodies a valve block 10, a second block 11 disposed alongside the block 10, and a sub base 12 to which the valve block 10 and second block 11 are connected by bolts 13.

The sub base 12 has an inlet passage 14 and an outlet passage 15 extending laterally therein with the inlet and outlet passages each having an extension at an angle thereto formed by passages 16 and 17 respectively, both of which are externally plugged by caps 18. The sub base 12 also has an internal passage 19 formed to extend laterally of the sub base and plugged externally by a cap 20. The passages formed in the sub base communicate with certain vertical passageways formed in the sub base and continuing into either the valve block 10 or the second block 11.

With the utilization of the sub base 12, the connections to external lines may be made thereto and the sub base also forms a mounting for the valve. The fluid sealing between the sub base 12 and the blocks 10 and 11 is accomplished by captured O rings 21 disposed about the vertical passages formed therein.

The valve block 10 has an internal bore 25 provided with a shoulder against which a stop plug 26 with an internal bore 27 engages. The bore 25 also has a hollow sleeve 28 seated at one end on the stop plug 26 and extending for a substantial part of the length thereof and provided with suitable radial ports for permitting fluid passage through the sleeve at certain locations.

A valve member 29 is slidably mounted within the sleeve 28 and within a valve chamber defined by the sleeve and terminating at one end in the stop 26. An end 30 of the valve member 29 constitutes a piston and, as shown in FIG. 3, is the upper end of the valve member, and is slidable within the sleeve at one end thereof with the sleeve in combination with an end cap 31 mounted in the valve block 10 defining a cylinder for the piston 30. A relatively light spring 32 is disposed between the cap 31 and the piston 30, and functions to urge the valve member toward closed position against the stop 26.

One of a pair of inlet passages to the valve chamber is provided by a vertical passage 35 formed in the valve block 10 and extending down into the sub base 12 into communication with the inlet passages 14 and 16 formed in the sub base. This series of passages places the internal bore 25 in the valve block in fluid communication with the inlet 14. Although the passage 35 is referred to as "vertical" as are other passages hereinafter, it is believed obvious that the valve may be mounted in various dispositions and therefore the passages may not always be vertically disposed.

The other inlet passage to the valve chamber includes a vertical passage 36 formed in the valve block 10 and the sub base 12 and extending vertically to intersect the internal bore 25 of the valve block outwardly of the sleeve 28 and the lateral inlet passage 14 in the sub base. Hydraulic fluid may then pass from the vertical passage 36 into the valve chamber through a plurality of radial ports 37 in the sleeve 28. The hydraulic fluid passing through the radial ports 37 then enters the valve chamber in the balanced area around the central part of the valve member. This hydraulic fluid may then move to the lower end of the valve chamber, as shown in FIG. 3, through the transverse ports 38 in the valve member which communicate with a longitudinal passage 39 in the valve member which opens through the end of said valve member adjacent the plug stop 26. The passage 35 and the inlet connection will also conduct high pressure fluid to the lower spool end in parallel with passage 39. This is expedient to obtain maximum flow area to the bottom of the spool, in order to accommodate the fast moving column of fluid without presenting too much viscous resistance to to the fluid as it changes direction and moves the spool to bypass condition.

An outlet passage from the valve chamber is formed by the radial ports 40 in the sleeve 28 which are blocked by the piston section 30 of the valve member when the valve member is in closed position, as shown in FIG. 3, and which communicate with a vertical passage 41 intersecting the bore 25 externally of the sleeve 28 and extending vertically in the valve block 10 and the sub base 12. The vertical passage 41 at its lower end communicates with the transverse passage 15 in the sub base 12 which connects to tank.

With the arrangement of the vertical passages 35 and 36 in the valve block 10, fluid pressure and flow are tending to force the valve member 29 against the relatively light spring 32. It will be seen that after a certain amount of movement of the valve member 29, said valve member will engage a stop 42 positioned within the confines of the spring 32 which is engageable with the valve member.

The cylinder for the piston 30, as defined by the hollow sleeve 28 and the end cap 31, has a vertical passage 43 communicating therewith which extends through the valve block 10 and into the sub base 12 to communicate with the transverse passage 19 in the sub base which extends to an intersection with a vertical passage 44 formed in the sub base 12 and the second block 11.

Means for admitting inlet fluid pressure to said cylinder includes the longitudinal passage 39 in the valve member having a plug 45 disposed in the upper end thereof which is provided with a flow restricting orifice 46 opening into the cylinder. This orifice restricts fluid flow from going into the cylinder and thereby forces the action of attempting to push the valve member 29 away from the plug stop 26 if the rate of pressure rise in the fluid at the inlet side of the valve is above a predetermined value. After a predetermined movement of the valve member, the outlet passage from the valve chamber will be opened and fluid may pass to tank to slow down the pressure rise. The action of the valve member moving under a rapid pressure rise forces fluid from the cylinder into the vertical passage 43 and thus through the transverse passage 19 and sub base 12 into the vertical passage 44 in the second block 11. This flow of fluid from the cylinder is the surge flow that is being generated by the exertion of input pressure at the lower side of the valve member, as shown in FIG. 3, which is rising at a rate sufficiently great that a corresponding pressure cannot reach the cylinder and thus charge the pilot capacity through the flow-restricting orifice 46. Therefore, the valve member moves to effectively deliver the surge flow rate into the cylinder and thus into the pilot capacity.

The second block 11 houses a relatively small fluid accumulator which functons to receive the surge flow from the cylinder in the valve block 10 to thus enable the valve member to sense the rate of change in the fluid pressure in the fluid at the inlet side of the valve chamber.

The second block 11 has a variable diameter bore 45a which, intermediate its length, mounts an assembly including a sleeve 46a abutting at one end thereof against an annular plate 47 fitted in a shoulder of the bore 45a and which is held against the annular plate by an annular screw plug 48. The sleeve 46a slidably mounts an accumulator piston 49 and thus constitutes a cylinder therefor along with an end of the block bore 45a, as shown in FIG. 3. The accumulator piston 49 is limited in movement in one direction by the annular stop plate 47, and may be urged thereagainst by a two-spring system. A first spring 50 is a low energy spring extended between an end of the accumulator piston 49 and a ball 51 seated on a member 52 movable in an enlarged end 53 of the bore 45a. The member 52 is held in position and carried by an end of a high energy spring 54 disposed within the enlarged section 53 of the bore. The opposite end of the spring 54 engages against a member 55 which, through a ball 56 engaging a piston 57, may be shifted to vary the spring force and the relative position of the piston 49 in the sleeve 46a. The piston is moved by rotation of an adjustable member 58 abutting the piston 57 and rotatable in a plug 59 which is threadably attached to the second block 11, as indicated at 60. Sufficient outward adjustment of member 58 will free the piston 49 from the annular plate 47 and the piston will start shifting upon exertion of any fluid pressure.

With relatively low fluid pressures acting upon the accumulator piston 49, the low energy spring 50 provides a high capacity for the accumulator, and when the relatively low pressure is exceeded, the accumulator piston 49 will then be seated on the ball 51 and the accumulator piston 49 will be subject to the high energy spring 54. The high energy spring 54 controls operation of the accumulator at much higher pressures and effects a capacity for the accumulator substantially less than the low energy spring 50. In effect, the high energy spring 54 provides much less resilience for the accumulator piston 49 than does the low energy spring 50. The utilization of two springs offers a great advantage in providing an accumulator in which large capacities are available at lower pressures, since to do so with a single high energy spring would require an extremely long spring or a complex mechanism associated with the spring. This two-spring action, however, does not limit the fact that there is sufficient capacity at high pressure, consistent with proper spring design. In general, it requires less capacity in higher pressure systems to get the same surge effect on the valve. Therefore, less capacity in the high pressure spring can be tolerated than in the low pressure spring.

Any leakage fluid within the enlarged area 53 of the bore behind the accumulator piston may discharge through a vertical passage 61 communicating therewith which extends vertically into the sub base 12 to communicate with the drain outlet passage 15 through the passage 17 in the sub base.

In order to have the valve also function as a pilot relief, a vertical passage 62 in the second block 11 communicates with the drain passage 15 in the sub base 12 by means of passages in the sub base (not shown). As the pressure of the fluid in the accumulator exceeds a value to shift the accumulator piston 49 to a position to uncover the passage 62, fluid in the accumulator may then discharge to drain.

It will be noted that the adjustable member 58 may be moved inwardly to an extent sufficient to fully compress the low energy spring 50 and thus cause the ball 51 to engage the accumulator piston 49 and in effect remove the low energy spring 50 from the system.

It will thus be seen that during a relatively slow change in hydraulic fluid pressure, the flow restricting orifice 46 in the valve member permits fluid to move into the piston cylinder quickly enough as to charge the accumulator and the difference in pressure at opposite ends of the valve member, as determined by the relatively light spring 32 engageable with the valve member, is not sufficient to move the valve member from closed position. When the rate of fluid pressure rise in the fluid at the inlet side of the valve member exceeds a predetermined value, the fluid cannot flow sufficiently fast through the orifice 46 to exert a pressure opposing the pressure of fluid in the inlet passages, and therefore the valve member senses this rapid change in pressure and shifts, as permitted by fluid flow from the cylinder to the accumulator, to connect the outlet passage from the valve chamber to the inlet passage and thus drains fluid from the system.

In the embodiment of the surge suppressor valve disclosed in FIG. 7, a valve block 100 is integrally joined with a second block 101 by attaching means (not shown). The valve block 100 and second block 101 are disposed side by side adjacent to each other and have common passages 102 and 103 which are sealed at the junction of the two blocks by O rings 104 and 105, respectively.

The valve block 100 has a valve chamber defined by the bore sections 106 and 107 with a dividing flange seat 107a therebetween. A valve member 108 is mounted in the valve chamber and slides within the flange seat to close off communication between the bore sections 106 and 107.

The valve block 100 has an inlet passage 109 leading to the valve chamber section 106 and an outlet passage 110 leads from the valve chamber section 107 and with the valve member 108 positioned as shown in FIG. 7, communication between the inlet and outlet passages is blocked with the valve member in closed position against a stop 111. The stop 111 is threadably mounted in the bore of the valve block 100, as indicated at 112, and has its end engaging the valve member 108 shaped to permit fluid flow into a central passage 113 in the valve member.

A cylinder 114 is defined in the valve block 100 by a part of the elongated bore formed therein at an end of the valve block remote from the valve chamber. The cylinder 114 movably receives a piston 115 having bore 115a which is yieldably urged toward the left, as shown in FIG. 7, into engagement with the valve member 108 by a light spring 116 extending between the piston and a cap 117 threadably mounted in the valve block bore. A stop 118 disposed within the spring 116 limits movement of the piston 115 toward the right, as viewed in FIG. 7.

Means are provided in the valve member for directing inlet fluid pressure to said cylinder 114, including the passage 113 previously referred to and including a flow restricting orifice 119 formed in a plug 120 threadably mounted in the valve member, as well as the piston bore 115a.

The second block 101 has an accumulator cylinder 125 closed off at an end of the block by a cap 126 threaded in the block 101 and the accumulator cylinder communicates with the valve block cylinder 114 through the passage 103 whereby fluid discharged from the last referred to cylinder may move into and be stored in the accumulator cylinder 125. The accumulator has a movable piston 127 which is held at the base of the cylinder 125 by a spring 128 engageable between the piston and an end cap 129 threadably attached to the block 101. Movement of the accumulator piston 127 toward the right, as viewed in FIG. 7, is limited by the engagement of a stem 130 on the piston with the end cap 126 while movement toward the left is limited by engagement between a stop 131 disposed within the spring 128 and engageable with a projection 132 on the end of the piston 127 opposite the stem 130. Any fluid leaking past the accumulator piston 127 enters a chamber 133 and passes to drain through passage 102 which is connected to the outlet passage 110 in the valve block 100 through the valve chamber section 107.

The embodiment of FIG. 7 utilizes an accumulator with a single spring associated with the accumulator piston rather than a two-spring accumulator as disclosed in the embodiment of FIGS. 1 to 6; however, in other respects the operation of the surge suppressor valve disclosed in FIG. 7 is the same as that described in connection with the embodiment of FIGS. 1 to 6. As soon as an excessive rate of pressure rise is sensed, the rise can be slowed down by discharging to tank through the outlet passage 110 the excess fluid that is causing the excessive pressure buildup. The size of the orifice 119 determines the rate of pressure rise at which the valve 108 will open to connect the inlet passage 109 with the outlet passage 110. With one size of orifice determining one rate of pressure rise, a smaller orifice would result in the valve member 108 opening at a lesser rate of pressure rise.

The surge suppressor described herein has definite advantages over an accumulator. With an accumulator, which is a stored energy device, the surge or kinetic energy of the fluid is absorbed by the accumulator and decelerated by the buildup of pressure in the accumulator as the column of oil is brought to a rest. However, the stored energy that results in the accumulator is difficult to handle and causes great time delays in the fact that the capacity of the accumulator must be quite large in order to limit the pressure rise. In addition to this, the accumulator must discharge or eject its stored energy to be ready to accept another surge within a certain pressure limit. The discharge of this energy is rather difficult to cope with in many circuits. An accumulator device is also quite bulky and expensive.

On the other hand, the surge suppressor valve fundamentally bypasses the kinetic energy to a low pressure region, or a reservoir, while it is handling the surge. The surge suppressor valve does not depend upon the storage of kinetic energy in limiting the surge pressure. By automatically ejecting the small slug of fluid to the low pressure region, the valve automatically disposes the unwanted energy in the system to tank. By the action of bypassing energy to tank, the mechanism is inherently much smaller than the equivalent energy storing device, such as an accumulator. The speed of response and efficiency in which the surge is handled are extremely important, as are the size and price of the valve.

I claim:

A hydraulic surge suppressor valve comprising, in combination, means forming a valve chamber and inlet and outlet passages therefor, a valve member for controlling flow of fluid through said valve chamber and subject to inlet pressure, a piston subject to hydraulic pressure opposing the inlet pressure for moving the valve to a closed outlet blocking position, a cylinder for said piston, a light spring in said cylinder urging said valve member to closed position, a passageway in said valve member for communicating inlet fluid pressure to said cylinder, said passageway including a flow restricting orifice, said orifice providing the flow path through said passageway, a spring loaded accumulator means in fluid communication with the area of the cylinder housing the spring and including a cavity and a member movable therein to receive in the cavity fluid from said area enabling the valve to detect the rate of change of fluid pressure whereby the valve member opens when the rate of change of fluid pressure exceeds a predetermined value.

References Cited in the file of this patent

UNITED STATES PATENTS

| | | |
|---|---|---|
| 1,776,937 | Timbs | Sept. 30, 1930 |
| 1,846,483 | Gilbert | Feb. 23, 1932 |
| 2,333,522 | Clifton | Nov. 2, 1943 |
| 2,689,583 | Gardiner | Sept. 21, 1954 |
| 2,724,406 | Murray | Nov. 22, 1955 |
| 2,752,754 | Jaseph | July 3, 1956 |

FOREIGN PATENTS

| | | |
|---|---|---|
| 1,076,885 | France | Apr. 21, 1954 |